(12) United States Patent
Tam et al.

(10) Patent No.: US 12,415,942 B2
(45) Date of Patent: Sep. 16, 2025

(54) LIGHT OR HEAT TRIGGERED FRONTALLY CURED CURE-ON-DEMAND ADHESIVES KIT

(71) Applicant: Nano and Advanced Materials Institute Limited, Hong Kong (HK)

(72) Inventors: Yiu Sun Tam, Hong Kong (HK); Yong Zhu, Hong Kong (HK); Chenmin Liu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 532 days.

(21) Appl. No.: 17/968,824

(22) Filed: Oct. 19, 2022

(65) Prior Publication Data
US 2023/0129505 A1    Apr. 27, 2023

Related U.S. Application Data

(60) Provisional application No. 63/270,566, filed on Oct. 22, 2021.

(51) Int. Cl.
| | | |
|---|---|---|
| C08F 2/46 | (2006.01) | |
| C08F 2/50 | (2006.01) | |
| C08G 61/04 | (2006.01) | |
| C09J 133/08 | (2006.01) | |

(52) U.S. Cl.
CPC .................. *C09J 133/08* (2013.01)

(58) Field of Classification Search
CPC ...... C09J 163/00; C09J 133/08; C09J 135/02; C08F 222/103; C08F 222/102; C08G 59/68
USPC ............. 522/29, 7, 6, 71, 1, 189, 184; 520/1
See application file for complete search history.

(56) References Cited

U.S. PATENT DOCUMENTS

| | | | |
|---|---|---|---|
| 7,235,593 B2 * | 6/2007 | Crivello | C09J 163/00 522/67 |
| 2005/0092428 A1 | 5/2005 | Crivello | |
| 2007/0267134 A1 | 11/2007 | Konarski et al. | |
| 2015/0152215 A1 | 6/2015 | Xie et al. | |
| 2016/0236983 A1 | 8/2016 | Buergel et al. | |
| 2016/0280867 A1 | 9/2016 | Nowak et al. | |
| 2019/0309123 A1 | 10/2019 | Liska et al. | |

FOREIGN PATENT DOCUMENTS

| | | |
|---|---|---|
| EP | 0112210 A1 | 6/1984 |
| WO | 2013090988 A1 | 6/2013 |
| WO | 2017100459 A1 | 6/2017 |

OTHER PUBLICATIONS

Holt et al, Cure-on-demand wood adhesive based on the frontal polymerization of acrylates, 2016, J. Appl. Polym. Sci., 44064, 1-5 (Year: 2016).*
John A. Pojaman (2016), "Cure-on-demand wood adhesive based on the frontal polymerization of acrylates.", Journal of Applied Polymer Science, 133 (40), https://doi.org/10.1002/ app.44064.
1st Office Action of the corresponding China patent application No. 202211290136.1 mailed on Jun. 28, 2025.

* cited by examiner

*Primary Examiner* — Jessica Whiteley
(74) *Attorney, Agent, or Firm* — IDEA Intellectual Limited; Sam T. Yip

(57) ABSTRACT

A cure-on-demand adhesive kit capable of self-sustaining frontal polymerization after a heat or actinic radiation trigger for bonding two substrates is provided. The kit includes a first monomer/oligomer component and a UV or thermal cure catalyst component. In practical application, the first monomer/oligomer component and the UV or thermal cure catalyst component are mixed together to form a ready-to-use prepolymer mixture. The prepolymer mixture is applied onto the surface of a first substrate, and the first substrate is contacted with a second substrate by the mixture applied side. After giving a heat or actinic radiation trigger, a self-sustaining frontal polymerization of the mixture will be started for curing the mixture between two substrates as an adhesive to adhere the two substrates.

9 Claims, 6 Drawing Sheets

LIGHT OR HEAT TRIGGERED FRONTALLY CURED CURE-ON-DEMAND ADHESIVES KIT

CROSS-REFERENCE TO RELATED APPLICATION

The present application claims priority from U.S. provisional patent application Ser. No. 63/270,566 filed Oct. 22, 2021, and the disclosure of which is incorporated herein by reference in its entirety.

FIELD OF THE INVENTION

The present invention generally relates to adhesive fields. More specifically, the present invention relates to formulations and cure methodologies which enable adhesives to be cured on demand by frontal polymerization (FP). In particular the invention provides adhesives with long shelf and pot life and rapid cure kinetics following the cure trigger event.

BACKGROUND OF THE INVENTION

Adhesives have been widely used in industrial applications for centuries. The physical and chemical properties of adhesives may be tuned through the composition of the adhesive polymer chemistry and the use of additives in the formulation to achieve the desired performance requirements. In traditional formulations of adhesives, there is usually a trade-off between pot life (also known as "working time" or "useable life") and cure time. Therefore, fast adhesive system cure times inevitably lead to shorter pot life times, making some adhesive applications impractical. Conversely, adhesive systems having a longer pot life takes a longer time to cure, that may increase manufacturing time on a production line and reduce production efficiency.

For industrial applications, there are four possible approaches for creating additives with acceptable pot life times along with acceptable cure times. The first is frozen systems, in which a highly-reactive epoxy curing system is rapidly mixed at room temperature and stored at low temperature. This approach provides a reasonably fast curing process and stable reactivity by virtue of cold storage according to the Arrhenius theory concerning the polymerization process. The disadvantage of such systems is that the handling characteristics of the adhesive constantly change as the adhesive thaws. Therefore, it is difficult to automate the application and cure cycles. In addition, once thawed, curing starts spontaneously and the entire batch must be used in a relatively short time. The second approach is blocked catalyst systems, in which the reactivity is blocked due to an encapsulated catalyst. However, blocked catalyst systems might be spontaneously cured during storage. The third approach is surface activated systems, which possess excellent processing characteristics provided a gap between surfaces to be bonded is less than 0.5 mm. Cyanoacrylate adhesives are typical surface activated systems which are typically used in such gaps and ambient moisture is the catalyst trigger. Finally, cure-on-command systems may be used, which typically have a very long shelf and working life, but cure rapidly when an assembly operator or an automated assembly system gives the curing "command". The command typically is the application of actinic radiation to the polymer system being cured. This technology provides an efficient and cost-effective way to improve the overall rate of bonding, with the ability to rework areas until initiation of cure.

Several approaches have been proposed for curing on demand adhesive system. WO2017/100459A1 describes cure-on-demand, moisture-curable, urethane-containing prepolymers having urethanes incorporated into a sulfur-containing prepolymer backbone for use in sealant applications. The cure-on-demand moisture-curable urethane-containing prepolymers are terminated with polyalkoxysilyl groups and are curable in the presence of moisture. The compositions contain a controlled release moisture cure catalyst. Compositions including the moisture-curable urethane-containing pre-polymers provide cured compositions exhibiting improved tensile strength and/or elongation. A controlled release moisture cure catalyst has little or no activity until released, such as chemically and/or physically. When released, controlled release moisture cure catalysts provided by this disclosure can catalyze the reaction between moisture/water and the terminal polyalkoxysilyl groups of the polyalkoxysilyl-terminated urethane-containing sulfur-containing prepolymer. In this disclosure, the controlled released catalyst is use to realize the cure-on-demand function.

US 2016/0280867A1 relates to rapidly curing, on-demand, adhesive systems that possess a non-thermal trigger, and that are delivered in a form awaiting triggering at a later time by applying ultrasonic energy. It presents a resin-based compound with an encapsulated catalyst to form an uncured resin-based adhesive. The disclosure describes compositions and methods designed to use ultrasound energy as a method to selectively trigger the cure of epoxy or acrylate resin systems. Ultrasound-based triggers have the benefit of being able to transmit through solid or opaque media. Therefore, it provides an "on demand" ultrasound-triggered system for epoxy resin- and acrylate resin-based systems.

WO2013/090988A1 provides a sealant with optionally long shelf and work life and optionally rapid cure kinetics following the cure trigger event. It relates to formulations and cure methodologies which enable a sealant to be cured on demand. The light triggered cure on demand sealant formulation comprises (a) a curable sealant prepolymer(s) or monomer(s) thereof; and (b) a source of unsaturation to facilitate crosslinking which is either separate and/or part of component (a), component (a) being capable of generating reactive species such as free radicals when the formulation is subjected to a light trigger.

U.S. Pat. No. 7,235,593 discloses reactive adhesive compositions that can be activated with actinic radiation, manipulated for an extended time and then cured thermally. The prepolymer mixture for the reactive adhesive contains a catalyst component and a monomer/oligomer component. The monomer or oligomer is chosen from oxetane monomers, oxirane monomers, oxetane oligomers and oxirane oligomers. It presents certain types of epoxides and oxetane resins can be irradiated with UV light in the presence of an onium salt catalyst. The brief irradiation releases a catalyst that instantaneously reacts with the epoxide or oxetanes to form an activated monomeric species. As long as there is no input of thermal energy, the resin remains fluid (i.e., no significant increase in viscosity) for an indefinite period—on the order of hours to days. It can be handled, applied and the components positioned. Simply raising the temperature a few degrees triggers a very rapid polymerization that "sets" the adhesive. Moreover, the temperature of the entire body of the prepolymer mix does not have to be raised to initiate cure; a point of initiation will propagate the reaction throughout the body of the mixture. Under these conditions, the cure can be completed in a few seconds.

In current adhesive or sealant system, more and more requirement from application is focusing on the balance between a long pot life at ambient temperature, and subsequent rapid cure kinetics following a cure trigger even with good flow-ability, acceptable bonding strength. As for as various application areas are concerned, the high penetration of adhesive or sealant together with long pot life is becoming more and more important. However, the curing process usually including high temperature heating or UV radiation is must to achieve the overall formation of crosslinked polymer structure. Therefore, the actual curing process usually needs the huge curing room or heating oven in some manufacturing process. Although the cure-on-demand adhesive can be achieved through UV radiation, the effective UV trigger is hardly used for highly penetrated gap application or some non-transparent adhesive with fillers inside.

While the above systems can be used for cure-on-demand applications, there remains a need in the art for improved polymer systems that can be used as cure-on-demand systems for adhesive bonding. The present invention addresses this need.

SUMMARY OF THE INVENTION

It is an objective of the present invention to provide formulations and means to cure adhesives on demand with frontal polymerization, overcoming the limitations inherent in conventional curing techniques. Particularly, the present adhesive kit is "cured on demand" by providing a light or a heat source as a means to trigger the curing process.

In accordance with a first aspect of the present invention, a cure-on-demand adhesive kit capable of self-sustaining frontal polymerization after a heat or actinic radiation trigger for bonding two substrates is provided. The kit includes a first monomer/oligomer component having 100 parts by weight of one or more of a monomer or an oligomer selected from an acrylate or epoxy resin and a UV or thermal cure catalyst component having 2 to 50 parts per hundred first monomer/oligomer component parts. The UV or thermal cure catalyst component is selected from a peroxide compound, a benzopinacol derivatives, an iodonium salt or any combination thereof. Specifically, the UV or thermal cure catalyst component is a peroxide compound if the first monomer/oligomer component is an acrylate or a combination of a benzopinacol derivatives and an iodonium salt if the first monomer/oligomer component is an epoxy resin. In practical application, the first monomer/oligomer component and the UV or thermal cure catalyst component are mixed to obtain a ready-to-use prepolymer mixture which will be applied onto a first substrate. After that, the first substrate and the mixture are contacted with a second substrate and wait for a cure demand of bonding the first substrate and the second substrate together. Once the cure demand, such as a heat or actinic radiation trigger, is given, a self-sustaining frontal polymerization will be initiated and the mixture will start curing as an adhesive to adhere the two substrates.

In accordance with one embodiment of the present invention, the first monomer/oligomer component is an acrylate selected from monoacrylates, diacrylates, triacrylates, tetraacrylates, pentaacrylates or any combination thereof.

In accordance with another embodiment of the present invention, the first monomer/oligomer component is an epoxy resin selected from monoepoxides, diepoxides, triepoxides, tetraepoxides, pentaepoxides, phenolic resins or any combination thereof.

In accordance with one embodiment of the present invention, the first monomer/oligomer component is an epoxy resin selected from diglycidyl derivatives of bisphenol A, diglycidyl derivatives of bisphenol F or a combination thereof.

In accordance with one embodiment of the present invention, the UV or thermal cure catalyst is selected from benzopinacol derivatives or iodonium salts, and the iodonium salts are selected from one or more of phosphonium, sulfonium, diazonium, ferrocenium, thiopyrylium, pyrylium or selenonium salts.

In accordance with another embodiment of the present invention, the iodonium salts might be a diaryliodonium salt.

In accordance with one embodiment of the present invention, the heat or actinic radiation trigger is applied to start the self-sustaining frontal polymerization and is withdrawn after the self-sustaining frontal polymerization begins.

In accordance with one embodiment of the present invention, at least one of the substrates has a rigid surface.

In accordance with another embodiment of the present invention, the at least one of said substrates is selected from a rigid metal substrate, a rigid glass substrate, a rigid composite substrate, a flexible metal substrate, a flexible glass substrate, a flexible polymer substrate, or a flexible composite substrate.

In accordance with one embodiment of the present invention, the heat or actinic radiation trigger is applied at or below ambient temperature.

In accordance with another embodiment of the present invention, the heat or actinic radiation trigger is applied at a total irradiation of 50,000 to 300,000 mJ/cm$^2$.

In accordance with another embodiment of the present invention, the heat or actinic radiation trigger includes exposing the prepolymer mixture to a heat source at a temperature of approximately 150 to 250° C.

BRIEF DESCRIPTION OF THE DRAWINGS

Embodiments of the invention are described in more details hereinafter with reference to the drawings, in which.

DETAILED DESCRIPTION

Figure 1:
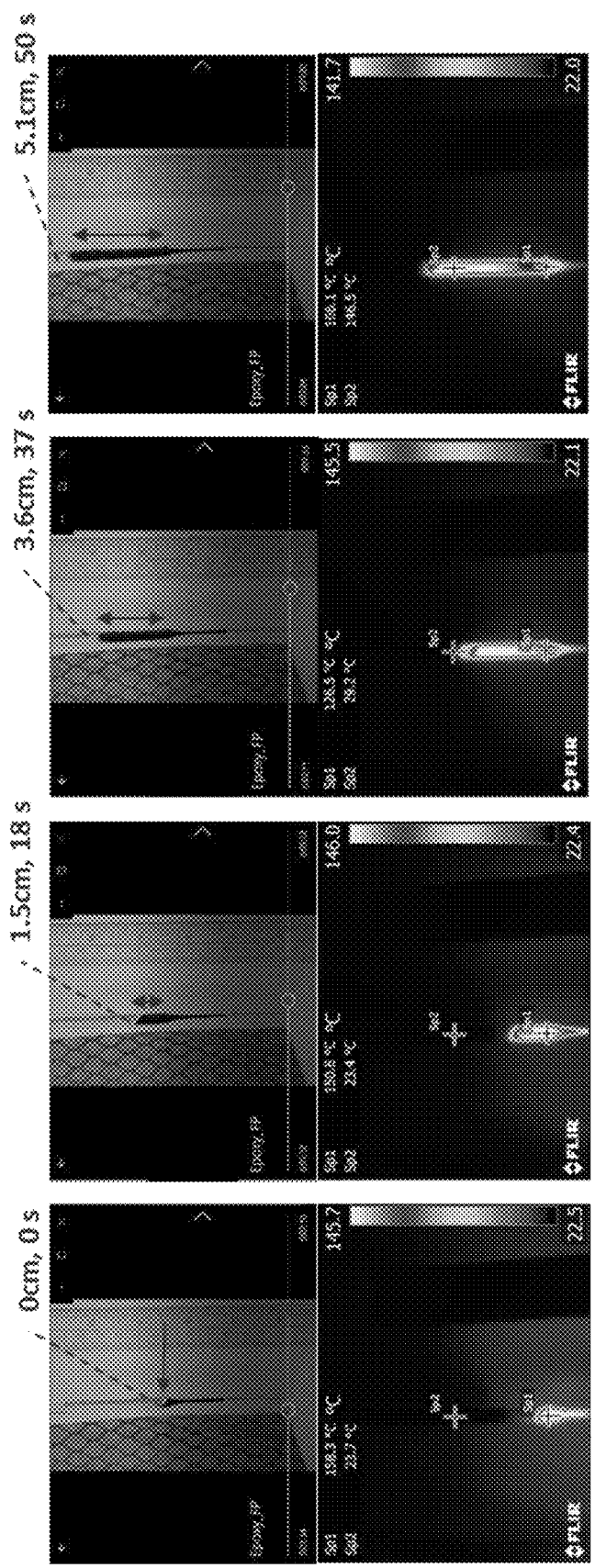
FIG. 1 depicts camera and FLIR camera recording images of frontal polymerization of an example.

In the following description, a cure-on-demand adhesive kit capable of self-sustaining frontal polymerization after a heat or actinic radiation trigger for bonding two substrates and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

In accordance with a first aspect of the present invention, a cure-on-demand adhesive kit capable of self-sustaining frontal polymerization after a heat or actinic radiation trigger for bonding two substrates is provided.

The cure-on-demand adhesive kit is based on the frontal polymerization to cure the kit mixture between two substrates, in which the curing process is triggered by a hot spot or actinic radiation at ambient condition, and subsequently the curing front with self-generated heat gradually propagates along the adhesive layer from the trigger spot to the unreacted area. The overall curing process is automatically spread from the trigger spot to the other adhesive part without extra heating or lighting at ambient condition. This feature makes the kit more convenient to the end user especially in the application of coating operation in limited space, high depth gap sealing or under-fill in electronic packaging.

Iron or hot gun could be a source to generate a hot spot to trigger a local curing process. Once the polymerization is triggered, a curing front will be generated at the hot spot by the self-generated reaction heat and subsequently spreads to neighboring monomers, results in continuous polymerization till the entire adhesive cured. Therefore, such reaction system needs a low reaction rate at the storage temperature and a very high reaction rate at curing temperature. The essential criterion for frontal polymerization is that, after the reaction triggering, the system must generate sufficient heat exceeding the heat loss and the system must be very stable before the trigger. Hence, such frontal polymerization system is adapted in the present cure-on-demand adhesive kit.

Accordingly, the cure-on-demand adhesive kit capable of self-sustaining frontal polymerization after a heat or actinic radiation trigger for bonding two substrates of the present invention includes a curable adhesive first monomer(s)/oligomer(s) having a reactive moiety(s) capable of cross linking; and a thermal or UV cure catalyst(s); and optionally, a filler(s) and/or additive(s).

The adhesive monomer and/or oligomer may be present in an amount of up to about 99% based on the total weight of the kit formulation. It will be appreciated that this amount will vary depending on the amount of optional reinforcements and/or fillers and other additives present in the formulation.

The monomer and/or oligomer described above may be acrylate resins. Exemplary acrylate resins include monoacrylates, diacrylates, triacrylates, tetraacrylates, pentaacrylates and combinations thereof. The acrylate of the invention preferably has an acrylate functionality ≥2.

The monomer and/or oligomer described above may also be epoxy resins. Non-limiting examples of epoxy resins include monoepoxides, diepoxides, triepoxides, tetraepoxides, pentaepoxides, phenolic resins and any combination thereof. Exemplary epoxy resins include diglycidyl derivatives of bisphenol A, diglycidyl derivatives of bisphenol F and any combination thereof. The epoxy resin of the invention preferably has an epoxide functionality ≥2.

A UV or thermal cure catalyst is provided in an amount from 2 to 50 parts per hundred parts of the monomer/oligomer component. When the first monomer/oligomer component is an acrylate, the catalyst is a peroxide compound.

When the monomer/oligomer component is an epoxide resin, the UV or thermal cure catalyst is a combination of benzopinacol derivatives and iodonium salts. Non-limiting examples of iodonium salts include phosphonium, sulfonium, diazonium and ferrocenium salts or from thiopyrylium, pyrylium and selenonium salts, more preferably from aryl-substituted representatives of these salts. According to one embodiment of the present invention, a diaryliodonium salt is particularly used for addressing this purpose.

The adhesive monomer/oligomer component may include other functional groups such as but not limited to those disclosed in US 2019/0309123 A1 and US 2015/0152215 A1, the disclosures of which are incorporated herein by reference. These functional groups may assist in the cure on demand mechanism.

In some cases, frontal polymerization may be a ring-opening polymerization. Non-cyclic monomers such as vinyl ethers may be used in this process. Other pre-polymers include multivalent epoxides (oxiranes), thiiranes (episulfides), oxetanes, lactames, lactones, lactide, glycolide, tetrahydrofurane, or mixtures thereof or mixtures with vinyl ethers.

The kit may optionally include fillers and/or additives such as carbon black, aluminum oxide, calcium carbonate, surface treated silicas, fumed silica, mica, cristobalite, and talc. Other conventional fillers and additives may also be used in the kit of the present invention.

The "cure-on-demand" adhesive kit of the present invention provides an optional curing action via UV radiation or heat-based triggers. After mixing the components of the kit to obtain a ready-to-use prepolymer mixture, the ideal cure profile of the mixture would show constant viscosity until a trigger is given (e.g., a UV light trigger) leading to a rapid cure. This ideal cure profile has the effect of achieving a substantially infinite pot life while awaiting curing; in other words, curing process does not begin until UV light or heat trigger is given to the prepolymer mixture. Further, the cure reaction is engineered to be self-sustaining. By "self-sustaining" the reaction, once initiated, continues on its own through the frontal polymerization process where the polymerization "front" that has been triggered, passes through the entire thickness of the polymer adhesive, curing the adhesive without the need for further application of light or heat. The "front" of the polymerization maintains the polymerization reaction along the front line as it advances along though uncured polymer, curing it as it advanced.

In some embodiments, the heat or actinic radiation is applied to start the self-sustaining frontal polymerization and is withdrawn after the self-sustaining frontal polymerization begins. Generally, the heat or actinic radiation trigger is a total irradiation of 50,000 to 300,000 mJ/cm$^2$ or includes a heat trigger of 150 to 250° C.

The kit of the present disclosure has a shelf life of at least 1 month, or at least 4 months, or at least 6 months, or greater than 6 months, when stored at 25° C. or below.

In practical application, the ready-to-use prepolymer mixture may be applied directly onto the surface of a substrate or over an underlayer by any suitable coating process known to those of ordinary skill in the art. Typical applications include extrusion from an application nozzle which may be manually or automatically dispensed.

To activate, hold and ultimately polymerize the kit as an adhesive to bond two substrates, it takes the following actions:
a. mixing the catalyst(s) and the monomer/oligomer component(s) of the kit to obtain a prepolymer mixture;
b. applying the prepolymer mixture onto a first substrate;
c. adhering the first substrate to a second substrate by the mixture applied side; and
d. providing a heat or actinic radiation trigger to the prepolymer mixture between the first substrate and the second substrate for binding the two substrates together.

By providing the heat or UV light trigger, the self-sustaining frontal polymerization is initiated between two substrates and the viscosity and temperature of the mixture rise rapidly for curing. In some embodiments, the heat or actinic radiation trigger is applied at or below ambient temperature.

In some embodiments, at least one of the substrates has a rigid surface and is selected from a rigid metal substrate, a rigid glass substrate, a rigid composite substrate, a flexible metal substrate, a flexible glass substrate, a flexible polymer substrate, or a flexible composite substrate.

The invention also relates to a coating process for attaching or adhesively bonding pieces or filling hollow spaces or intermediate gaps, said process comprising a step of applying a liquid adhesive composition according to the invention to a substrate (aluminum, steel, glass, composites, etc.).

EXAMPLES

Epoxy resin is one of the most important functional monomers and pre-polymers used in adhesive fields which can provide a strong adhesion to many surfaces. Apart from using amine as curing agent, epoxy resin can be polymerized via a radical induced cationic frontal polymerization pathway. In the mentioned polymerization system, epoxy monomer such as bisphenol A diglycidyl ether (BADGE) is cured by benzopinacol (TPED) derivatives and iodonium salts in order to achieve the self-sustained frontal polymerization. The BADGE polymers are widely used for surface coatings, bonding and adhesives, flooring constructions, composites, electrical and electronic laminates, embedding and tooling and other applications.

As frontal polymerization is sustained by self-generated heat, the moving front with high temperature, as well as the temperature of heat trigger, can be visualized and recorded by FLIR camera. Hence, the front moving rate can be determined through the FLIR video.

Example 1

A 60/40 mixture by weight of TMPTA (trimethylolpropane triacrylate monomethyl ether) and PEGDA-575 (poly(ethylene glycol) diacrylate) are heated with a hot gun at 200° C. for 10 seconds in the presence of 0.6 phr (parts per hundred resin) of a cyclic peroxyketal initiator (LUPEROX 231); self-sustaining frontal polymerization of the mixture takes place rapidly.

Example 2

A mixture of BADGE (bisphenol A diglycidyl ether) is heated with a soldering iron heated to 200° C. for 10 seconds in the presence of 3 mol % TPED (benzopinacol) and 3 mol % IOC-8 (p-(octyloxyphenyl)phenyliodonium hexafluoroantimonate), self-sustaining frontal polymerization of the mixture takes place rapidly.

Example 3

UV radiation of BADGE and 20 phr EOM (3-ethyl-3-oxetanemethanol) for 30 seconds at 7000 mW/cm$^2$ in the presence of 3 mol % TPED (benzopinacol) and 3 mol % IOC-8 (p-(octyloxyphenyl)phenyliodonium hexafluoroantimonate) produces self-sustaining frontal polymerization of the mixture.

Example 4

Figure 6:
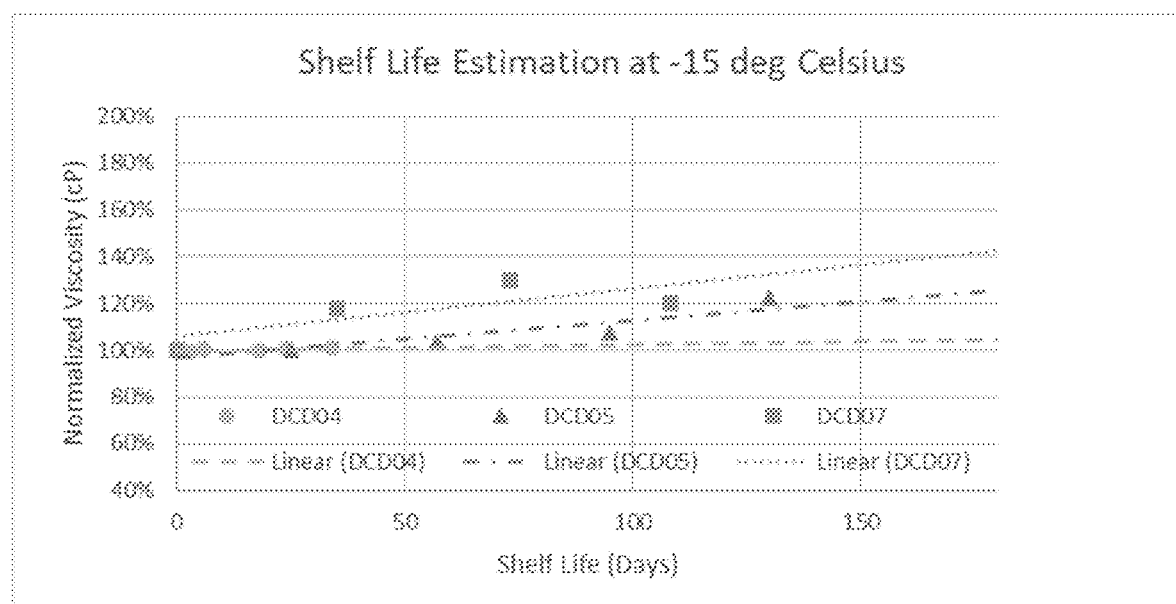
FIG. 6 exhibits normalized viscosity change ratios of three examples at −15° C., respectively.

The cure-on-demand adhesive kit (DCD01-07) triggered by a heat trigger has different viscosity in order to fit various applications. Moreover, the kit should have satisfactory pot life and shelf life which facilitate the application. Referring to FIG. 6 and Table 1, the pot life and shelf life are expressed in the time of 100% change in normalized viscosity of the adhesives are shown. Both pot life and shelf life are determined by the change of 100% viscosity with viscometer.

Seven formulations (DCD01-07) of epoxy cure-on-demand adhesive kit with different viscosity that fulfil the deliverable requirements are developed (Table. 1). Brookfield Viscometer DV-I Prime with spindle SC4-16 is used for all measurement of viscosity.

TABLE 1

| Formulations of epoxy cure-on-demand adhesive kit | | | | | | | | |
|---|---|---|---|---|---|---|---|---|
| Function | Chemical | DCD01 | DCD02 | DCD03 | DCD04 | DCD05 | DCD06 | DCD07 |
| Monomer | BADGE | 5.0 g | 5.0 g | 5.0 g | 5.0 g | 5.0 g | 5.0 g | 5.0 g |
| Initiator | TPED | 163 mg | 163 mg | 163 mg | 163 mg | 163 mg | 163 mg | 163 mg |
| Initiator | IOC-8 SbF$_6$ | 287 mg | 287 mg | 287 mg | 287 mg | 287 mg | 287 mg | 287 mg |
| Diluent | ECC | — | 5.0 g | 7.5 g | — | — | — | — |
| Diluent | EOM | — | — | — | 0.3 g | 1.0 g | 2.0 g | 3.0 g |

Example 5

Lap Shear Strength

Lap shear strength test is performed to evaluate shear strength and mode of failure of the present cure-on-demand adhesive kit (DCD01-07). Lap shear strength test is commonly used in the adhesive world to characterize the bond strength of adhesive. Each measures the strength of an adhesive on a special substrate. Lap shear strength is assessed using ASTM D1002, a standard test method for apparent shear strength of single-lap-joint adhesively bonded metal specimens by tension loading (metal-to-metal). The lap shear strength is calculated from below equation:

$$shear.strength = \frac{maximum.load.force}{bond.area},$$

and the results are shown in Table 2.

TABLE 2

Viscosity of epoxy cure-on-demand adhesive kit

| Sample name | Viscosity (cP) | Viscosity range |
|---|---|---|
| DCD01 | 16700 | High |
| DCD02 | 2004 | Medium |
| DCD03 | 1143 | Low |
| DCD04 | 15800 | High |
| DCD05 | 2400 | Medium |
| DCD06 | 751 | Low |
| DCD07 | 420 | Low |

It is shown that the cure-on-demand adhesive kit triggered by a heat trigger has different viscosity in order to fit various applications. The adhesives can be served for a wide range of application due to their tunable viscosity and high shear strength.

Pot Life

The pot life of adhesive (100% change in normalized viscosity) before initiation is required to be at least 8 hours at ambient storage. The viscosity change of developed adhesives after storage at ambient condition for 8 hours is measured and tabulated in Table. 3.

TABLE 3

Viscosity change of epoxy cure-on-demand adhesive

| | Viscosity (cP) | | |
|---|---|---|---|
| Adhesive | t = 0 | t = 8 h | change |
| DCD01 | 16700 | 17200 | +2.90% |
| DCD02 | 2004 | 2130 | +6.28% |
| DCD03 | 1143 | 1198 | +4.81% |
| DCD04 | 15800 | 16100 | +1.90% |
| DCD05 | 2400 | 2829 | +17.88% |
| DCD06 | 751 | 801 | +6.66% |
| DCD07 | 420 | 458 | +9.05% |

In pot life evaluation, only DCD05 has a bigger change in viscosity to about 17.88% change. The rest of them show a consistent viscosity in less than 10% change.

Front Moving Rate

Figure 2:
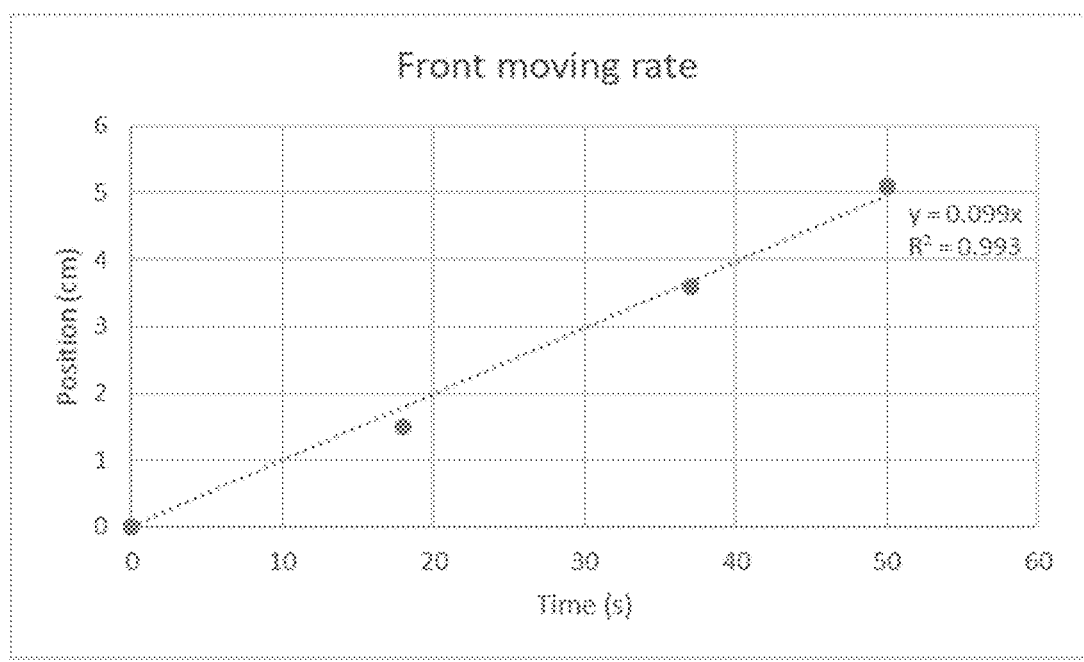
FIG. 2 depicts front moving rate of an example.

The frontal polymerization of developed adhesive should be initiated by hot spot trigger at 200~250° C. for less than 10 seconds. All developed adhesive can be triggered by hot gun at about 226° C. in 10 seconds to perform frontal polymerization. The curing of frontal polymerization of adhesive is recorded by camera and FLIR camera simultaneously. As shown in FIG. 1, the position and temperature of the curing front are tracked. The desired front moving rate is at least 1 cm/min and all developed adhesive can achieve this requirement (FIG. 2 and Table. 4).

TABLE 4

Front moving rate of developed adhesive

| Adhesive | Front moving rate (cm/min) |
|---|---|
| DCD01 | 5.94 |
| DCD02 | 8.08 |
| DCD03 | 4.31 |
| DCD04 | 2.62 |
| DCD05 | 10.09 |
| DCD06 | 11.06 |
| DCD07 | 11.96 |

Tensile Shear Strength on Metal

The tensile shear strength of developed adhesive is required to be higher than 10 MPa and 15 MPa on aluminum and steel as substrate, respectively. In order to fit the requirements, metal surface treatment is necessary for providing clean surface and increasing the surface area for adhesive bonding. For aluminum alloy 6061, the metal plates are abraded with P60 sand paper to increase roughness, then degreasing with acetone for 30 mins and finally treated with 4% (3-Glycidyloxypropyl) trimethoxysilane in methanol for 30 mins. For stainless steel 304, only degrease process with acetone for 30 mins has been conducted. The surface roughness of metals is measured by OLYMPUS Digital Microscope DSX1000.

The adhesive thickness of samples (DCD04-DCD07) is fixed to be 300 microns. The samples are thermally cured at 150° C. oven which mimics the temperature of frontal polymerization, and further thermal treatment of samples at 150° C. for several hours as industrial process in order to enhance the adhesive performance. The lap shear test is conducted by Lituo Tensile Tester with loading rate 1.3 mm/min according to standard test ASTM D1002.

Figure 3A:
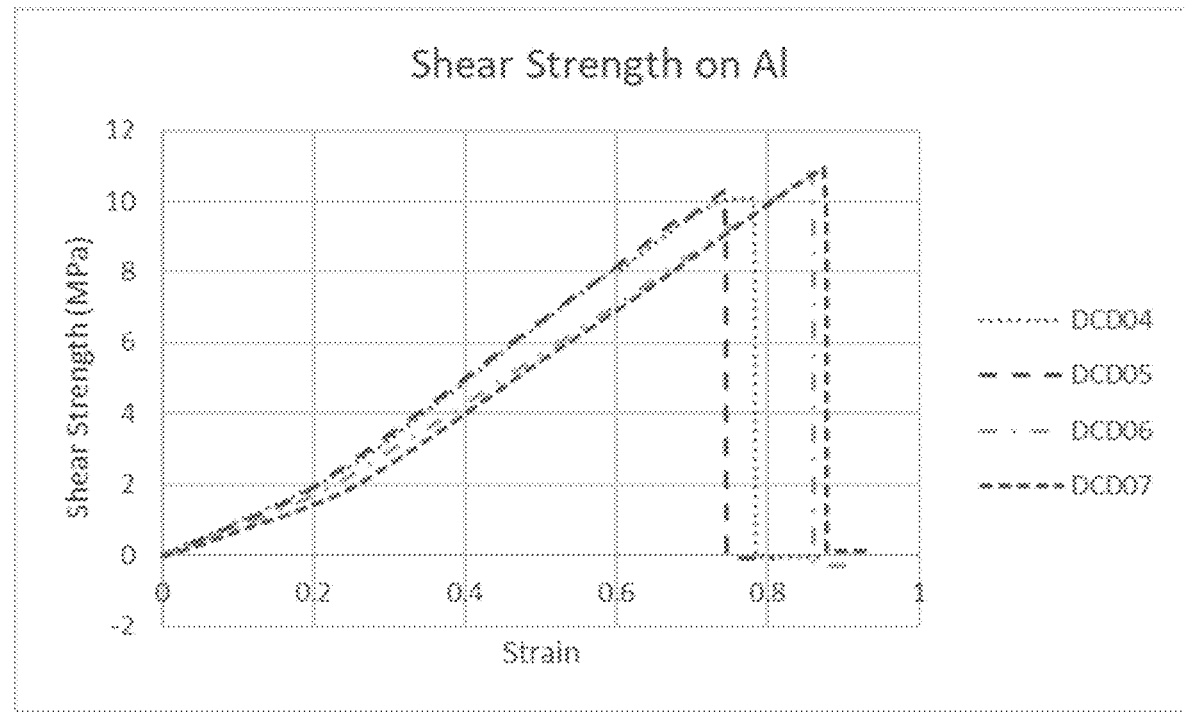
FIGS. 3A and 3B show the shear strength versus strain of exampled adhesives on aluminum and steel, respectively.
Figure 3B:
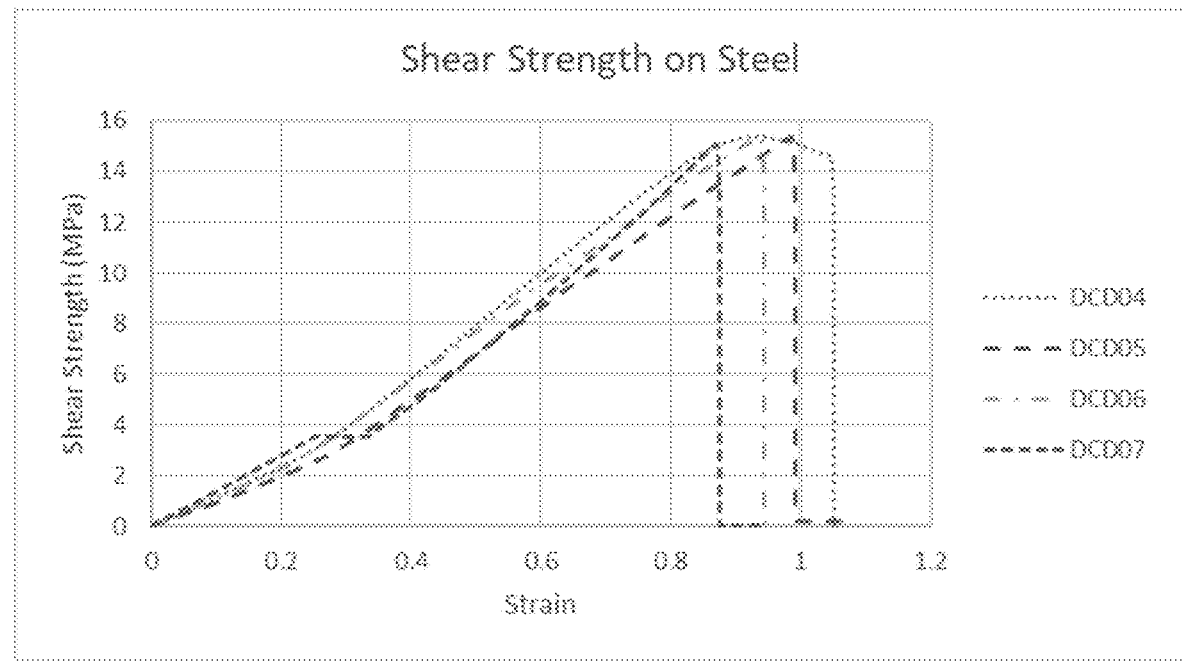

As shown in Table. 5 and FIGS. 3A-3B, the maximum shear strength of four developed adhesives can both achieve 10 MPa and 15 MPa on aluminum and steel, respectively.

TABLE 5

Lap shear strength of developed cure-on-demand adhesive

| | Adhesive | Al alloy 6061 | Stainless steel 304 |
|---|---|---|---|
| Max. | DCD04 | 10.0 | 15.3 |
| Shear | DCD05 | 10.3 | 15.4 |
| Strength | DCD06 | 10.7 | 15.4 |
| (MPa) | DCD07 | 10.9 | 15.1 |

Shelf Life

The shelf life of an adhesive is defined as the time for change in 100% in normalized viscosity of the adhesive at corresponding temperature, and the shelf life of an adhesive obeys Arrhenius Law. Ideally, the shelf life of developed adhesive is required to be at least 6 months. Therefore, accelerated ageing test of adhesive with different temperature can be performed to calculate and estimate the shelf life and storage temperature of the adhesive: (1) the storage temperature for 180 days shelf life is extrapolated; and (2) the shelf life at certain storage temperature is extrapolated.

Figure 4:
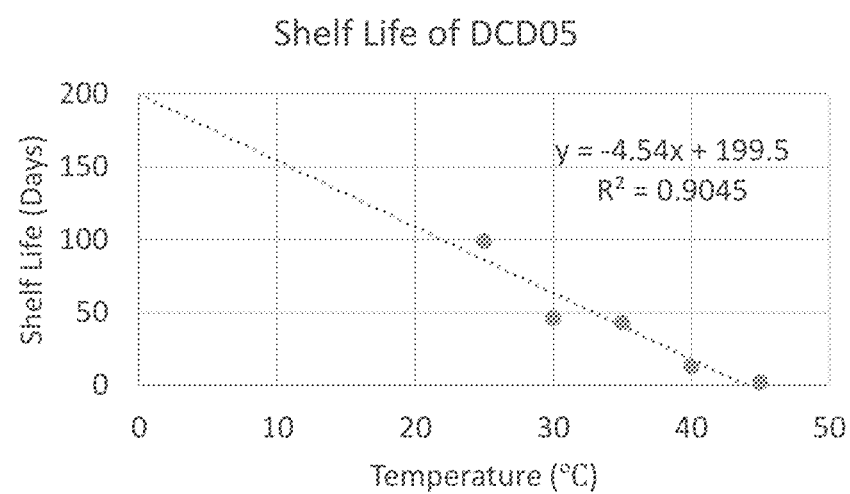
FIG. 4 depicts a shelf-life curve of an example.

One of the developed adhesive DCD05 has been tested its shelf life at different temperature and the temperature for 6 months storage is estimated. As shown in FIG. 4, the temperature for DCD05 with shelf life 6 months is calculated to be 4° C.

Figure 5A:
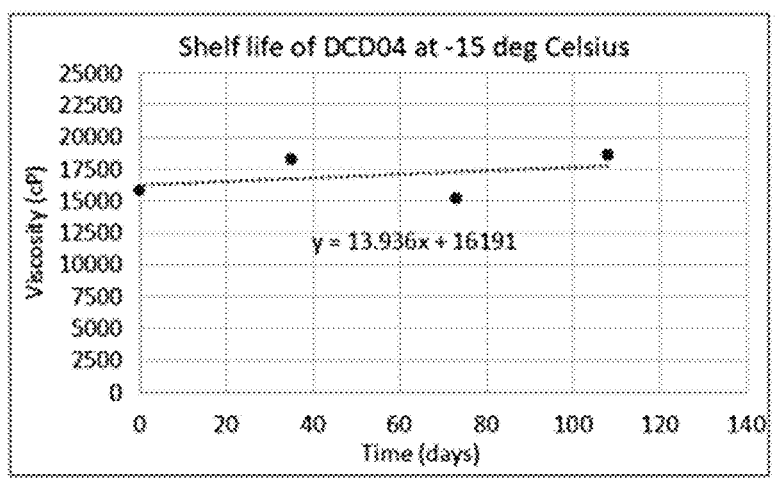
FIGS. 5A-5C show shelf-life curves of three examples at −15° C., respectively.
Figure 5B:
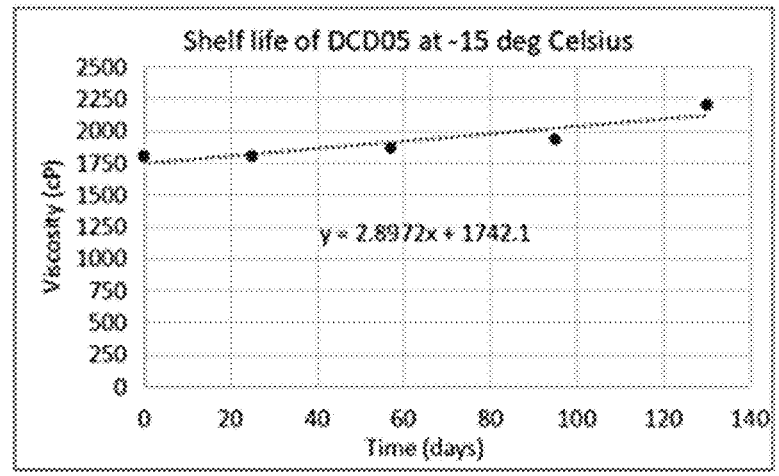
Figure 5C:
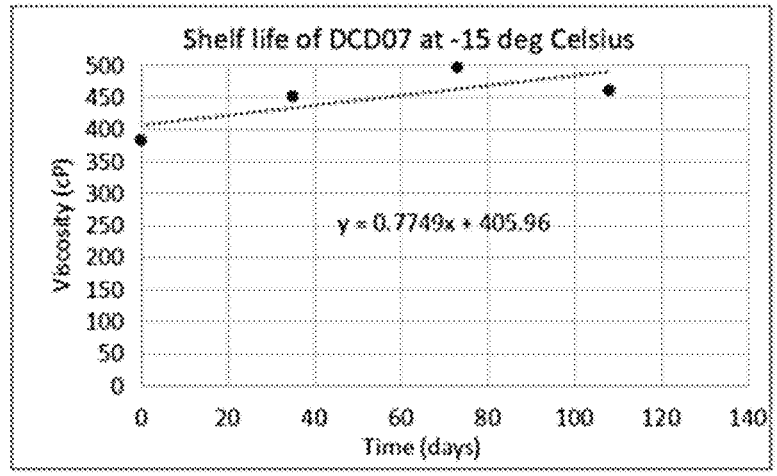

Viscosity of DCD04, 05 and 07 is regularly recorded at −15° C., respectively. As shown in FIGS. 5A-5C, the viscosity curves of three samples at −15° C. is extrapolated to find the shelf life at −15° C. Additionally, the Table. 6 shows the accelerated tests exhibited that the developed adhesives have at least 6 months shelf life storing at −15° C.

TABLE 6

Calculated shelf life of DCD01, 05 and 07 at −15° C.

| Adhesive | Calculated Shelf life at −15° C. (days) |
|---|---|
| DCD04 | 30438 |
| DCD05 | 641 |
| DCD07 | 464 |

To make the comparison among the DCD04(high viscosity), DCD05(mediate viscosity) and DCD07(low viscosity), the normalized viscosity is summarized in FIG. 6. According to the aforementioned principle to judge the pot life based on 100% change ratio of viscosity, the extrapolation is made with the viscosity at the beginning as 100%. The low viscosity recipe will keep the higher change ratio with the extension of storage time, but it is still longer than 180 days. The low viscosity recipe is much more stable under the storage condition. Therefore, the deliverable 6 months of shelf life can be achieved.

Summary

The present cure-on-demand adhesive kit with different viscosity are developed. These adhesives have more than 8 hours pot life at ambient storage. All formulations can be triggered at 200-250° C. hot spot for less than 10 seconds and perform frontal polymerization with satisfactory moving front rate (higher than 1 cm/min). After certain surface modification of metal substrate, lap shear strength of DCD04-07 can achieve 10 MPa and 15 MPa on aluminum and steel, respectively. Shelf life of developed adhesives were investigated by accelerated ageing test and the test showed that DCD04, 05 and 07 can have a shelf life longer than 6 months at −15° C. storage.

The adhesives can be served for a wide range of application due to their tunable viscosity and high shear strength. Although fine tune of formulation such as addition of fillers and additives is needed for commercialization and application, the present invention shows a positive result on the development of adhesives.

The foregoing description of the present invention has been provided for the purposes of illustration and description. It is not intended to be exhaustive or to limit the invention to the precise forms disclosed. Many modifications and variations will be apparent to the practitioner skilled in the art.

Moreover, in interpreting the disclosure, all terms should be interpreted in the broadest possible manner consistent with the context. In particular, the terms "include", "including", "comprise" and "comprising" should be interpreted as referring to elements, components, or steps in a non-exclusive manner, indicating that the referenced elements, components, or steps may be present, or utilized, or combined with other elements, components, or steps that are not expressly referenced.

The embodiments were chosen and described in order to best explain the principles of the invention and its practical application, thereby enabling others skilled in the art to understand the invention for various embodiments and with various modifications that are suited to the particular use contemplated.

What is claimed is:

1. A cure-on-demand adhesive kit capable of self-sustaining frontal polymerization after a heat or actinic radiation trigger for bonding two substrates, comprising a first monomer/oligomer component having 100 parts by weight and a UV or thermal cure catalyst component having 2 to 50 parts per hundred of the first monomer/oligomer component parts;
   wherein the first monomer/oligomer component and the UV or thermal cure catalyst component are mixed to obtain a ready-to-use prepolymer mixture and the ready-to-use prepolymer mixture is applied onto a first substrate;
   wherein the first monomer/oligomer component is an epoxy resin selected from diglycidyl derivatives of bisphenol A, diglycidyl derivatives of bisphenol F, or a combination thereof;
   wherein the UV or thermal cure catalyst component is a combination of benzopinacol derivatives and iodonium salts;
   wherein the first substrate is contacted with a second substrate by the mixture applied side and waits for a heat or actinic radiation trigger of bonding the first substrate and the second substrate together;
   wherein the heat or actinic radiation trigger starts a self-sustaining frontal polymerization of the mixture for curing the mixture as an adhesive to adhere the two substrates; and
   wherein the heat or actinic radiation trigger is providing a total irradiation of 50,000 to 300,000 mJ/cm$^2$ or a heat source with a temperature of approximately 150 to 250° C.

2. The kit of claim 1, wherein the first monomer/oligomer component is an acrylate and the UV or thermal cure catalyst component is a peroxide compound.

3. The kit of claim 2, wherein the acrylate is selected from monoacrylates, diacrylates, triacrylates, tetraacrylates, pentaacrylates or any combination thereof.

4. The kit of claim 1, wherein the iodonium salts are selected from one or more of phosphonium, sulfonium, diazonium and ferrocenium salts or from thiopyrylium, pyrylium, or selenonium salts.

5. The kit of claim 4, wherein the iodonium salts are selected from diaryliodonium salts.

6. The kit of claim 1, wherein the heat or actinic radiation is applied to start the self-sustaining frontal polymerization and is withdrawn after the self-sustaining frontal polymerization begins.

7. The kit of claim 1, at least one of the substrates has a rigid surface.

8. The kit of claim 7, the at least one of the substrates is selected from a rigid metal substrate, a rigid glass substrate, a rigid composite substrate, a flexible metal substrate, a flexible glass substrate, a flexible polymer substrate, or a flexible composite substrate.

9. The kit of claim 1, the heat or actinic radiation trigger is applied at or below ambient temperature.

\* \* \* \* \*